Oct. 27, 1931.  F. D. BEARLY  1,829,081
DERRICK
Filed Oct. 20, 1930
Fig. 1.
Fig. 2.
Fig. 3.
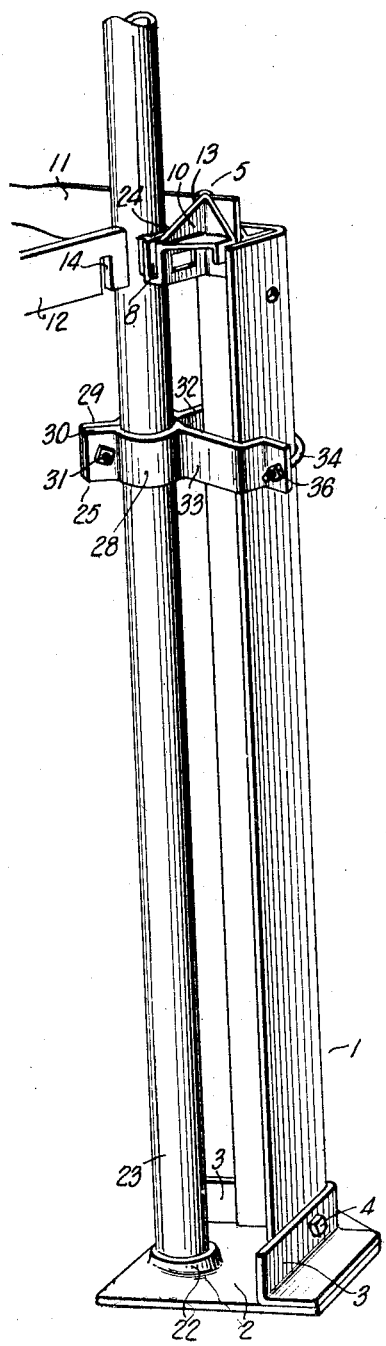
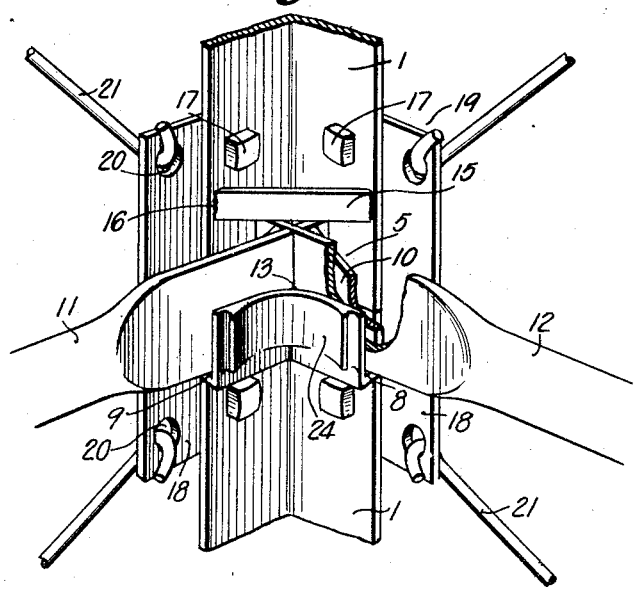
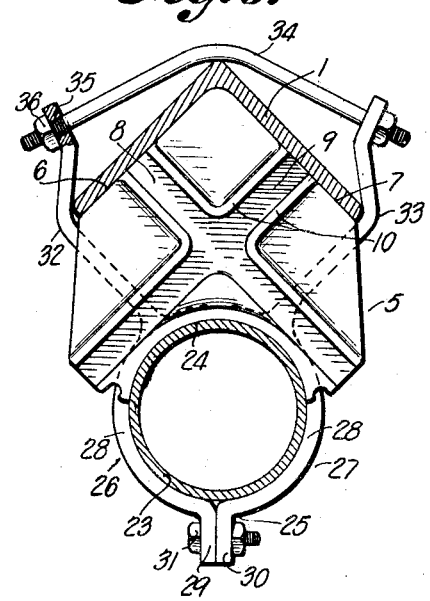
INVENTOR
Fred D. Bearly
BY Arthur C. Brown
ATTORNEY Patented Oct. 27, 1931

1,829,081

UNITED STATES PATENT OFFICE

FRED D. BEARLY, OF OKLAHOMA CITY, OKLAHOMA

DERRICK

Application filed October 20, 1930. Serial No. 489,924.

My invention relates to derricks and more particularly to couplings for joining derrick leg sections, the present invention constituting improvements over my co-pending application Serial Number 428,113.

Since a derrick of greater strength is required when drilling oil wells than is necessary for subsequent operations such as pulling rods and the like it is common practice to employ reinforcing legs in combination with ordinary or regulation derrick legs of comparatively light weight, when drilling wells, so that after completing the heavier work the reinforcing legs may be removed from the derrick and used in conjunction with other derricks thus reducing the cost of equipment.

The principal objects of my invention, therefore, are to modify the coupling of the above mentioned application in order to adapt the structure for the addition of a reinforcing leg, and to provide means for securely clamping the reinforcing leg to a regulation derrick leg.

In accomplishing these and other objects of my invention I have provided improved details of structure the preferred form of which is illustrated in the accompanying drawings, wherein:

Fig. 1 is a perspective view of a portion of a regulation derrick leg and of a reinforcing leg clamped thereto in spaced relation by a clamp and coupling member embodying my invention.

Fig. 2 is a perspective view of a derrick leg portion, particularly illustrating the arcuate seat of a coupling for receiving a reinforcing leg.

Fig. 3 is a transverse section of a regulation derrick leg and of a tubular reinforcing leg clamped thereto in parallel, spaced relation.

Referring more in detail to the drawings:

1 designates an angular leg section supported on a base plate 2, resting on the derrick foundation, and having flanges 3 to which the lower end of the leg section is secured by bolts 4 extended through the leg and base flanges. Fixed to the upper end of the leg section by welding or the like is a coupling member 5 having plane edge faces 6 and 7 for engaging the flanges of the angle leg.

Intersecting slots or sockets 8 and 9, parallel to the edge faces and reinforced by webs 10, are provided in the coupling member for seating derrick girths 11 and 12 respectively provided with oppositely extending notches 13 and 14 adjacent their ends for interlocking and engaging each other when the girths are seated in the slots of the coupling member.

Mounted on the derrick leg section 1 is a duplicate superimposed leg section having a transverse abutment plate 15 connected to the flanges thereof by means such as welding, as indicated at 16, for preventing disengagement of the girth members from their respective sockets when the superimposed section is mounted in functional position on the lower leg sections.

The adjacent ends of separate leg sections are securely connected together by bolts 17 extended therethrough and through the flanges 18 of a connecting plate 19 having openings 20 at its corners for receiving rods 21 provided for bracing the derrick.

The apparatus thus far described is similar to the derrick leg structure defined in my co-pending application to which reference has been previously made, however, in order to adapt a leg of this type for the application of a reinforcing leg, modifications of the base plate and of the coupling member are required.

On the base plate a slightly inclined boss 22 is formed for supporting a reinforcing leg 23, preferably of tubular formation, and each coupling member is provided with a seat 24 conforming to the contour of the reinforcing leg.

Means for maintaining the reinforcing leg in firm engagement with the seat of the coupling member includes a clamping bracket 25 comprising mating members 26 and 27, each including an arcuate portion 28 for receiving the reinforcing leg.

The inner ends of the members terminate in laterally extending ears 29 and 30 connected together in abutting relation by a bolt 31 extending through aligning openings in the ears. The opposite ends of the members comprise complementary angular arms 32 and 33 for engaging the outer edges of the angular leg and are drawn together by a bolt 34 extended through openings 35 in the arms and provided with nuts 36 for firmly anchoring the reinforcing leg to the angular leg.

In constructing a derrick, with the parts above described, a coupling member is welded to each angular leg section adjacent its upper end. A connector plate is further bolted to said end, and the opposite end of the leg is provided with an abutment plate as shown in Fig. 2.

After the derrick has been assembled with the girths seated in interlocked relation in the sockets of the couplings, the reinforcing legs are mounted in the corners of the derrick on the bosses of the base plates and are clamped into engagement with the seats of the couplings by the clamping brackets. In connecting the reinforcing legs to the angular derrick legs it is desirable to position a clamp at each joint of the reinforcing legs in order to produce a more rigid structure.

With a derrick constructed as above described the reinforcing legs may be installed or removed without disturbing the structure of the regulation derrick.

What I claim and desire to secure by Letters Patent is:

1. In combination with a derrick leg including abutting sections, a connector plate joining the sections, a coupling member at one end of the sections having transverse grooves and a seat, girth members adapted to engage said grooves, an abutment plate at the lower ends of the sections for retaining said girth members in the grooves, a reinforcing leg adapted to engage said seat, and means for clamping said reinforcing leg into engagement with the seat.

2. In combination with a derrick leg including abutting sections, a connector plate joining the sections, a coupling member at one end of the sections having intersecting grooves and an arcuate seat, girth members having interlocking ends engaging said grooves, an abutment plate at the opposite end of the sections for retaining said girth members in the grooves, a reinforcing leg adapted to engage said seat, and means for clamping said reinforcing leg into engagement with the seat.

3. In combination with a derrick leg including angular sections, a connector plate on the outer side of the leg joining the sections end to end, coupling members on the upper ends of the sections and on the inner side of the leg having transverse grooves, each of said couplings having a seat on its inner face parallel to the leg sections, girth members adapted to engage said grooves, a reinforcing leg adapted to engage said seats, and means for clamping said reinforcing leg into engagement with the seats.

4. In combination with a derrick leg including angular sections, a connector plate on the outer side of the leg joining the sections end to end, coupling members on the upper ends of the sections and on the inner side of the leg having transverse grooves, each of said couplings having an arcuate seat on its inner face parallel to the leg sections, girth members adapted to engage said grooves, abutment plates on the lower end of the sections for retaining the girth members in the grooves, a reinforcing leg adapted to engage said seats, and means for clamping said reinforcing leg into engagement with the seats.

5. In combination with a derrick leg including abutting angular sections, a connector plate joining the sections, a coupling member at one end of the sections having intersecting grooves and a seat on its inner face parallel to the leg sections, girth members adapted to engage said grooves, a reinforcing leg adapted to engage said seat, mating clamping members embracing said reinforcing leg and angular sections, and means for clamping said mating members together.

6. In combination with a derrick leg including abutting angular sections, a connector plate joining the sections, coupling members on the upper end of the sections having intersecting grooves, each of said couplings having an arcuate seat on its inner face parallel to the leg sections, girth members adapted to engage said grooves, abutment plates on the lower ends of the sections for retaining the girth members in the grooves, a reinforcing leg adapted to engage said seats, mating clamping members having portions conforming with the reinforcing leg and with the angular leg for embracing said legs, and means for clamping said mating members together.

In testimony whereof I affix my signature.

FRED D. BEARLY.